United States Patent
Tröger et al.

(10) Patent No.: US 10,635,625 B2
(45) Date of Patent: Apr. 28, 2020

(54) PLUG CONNECTOR COMPONENT, PLUG CONNECTOR, PLUG CONNECTOR SYSTEM AND METHOD FOR ASSEMBLING AND OPERATING A PLUG CONNECTOR

(71) Applicant: HARTING Electric GmbH & Co. KG, Espelkamp (DE)

(72) Inventors: Lutz Tröger, Osnabrück (DE); Christoph Gericke, Bad Lauterberg (DE); Markus Friesen, Espelkamp (DE); Karsten Walther, Königs Wusterhausen (DE)

(73) Assignee: HARTING Electric GmbH & Co. KG, Espelkamp (DE)

( * ) Notice: Subject to any disclaimer, the term of this patent is extended or adjusted under 35 U.S.C. 154(b) by 0 days.

(21) Appl. No.: 16/310,156

(22) PCT Filed: Jul. 7, 2017

(86) PCT No.: PCT/DE2017/100567
§ 371 (c)(1),
(2) Date: Dec. 14, 2018

(87) PCT Pub. No.: WO2018/006908
PCT Pub. Date: Jan. 11, 2018

(65) Prior Publication Data
US 2019/0332563 A1  Oct. 31, 2019

(30) Foreign Application Priority Data

Jul. 7, 2016  (DE) .......................... 10 2016 112 519

(51) Int. Cl.
*G06F 13/40* (2006.01)
*G06F 9/455* (2018.01)

(52) U.S. Cl.
CPC ...... *G06F 13/4068* (2013.01); *G06F 9/45533* (2013.01)

(58) Field of Classification Search
None
See application file for complete search history.

(56) References Cited

U.S. PATENT DOCUMENTS 6,227,722 B1 *  5/2001  Kropp .................. G02B 6/4249
                                                385/14
6,536,670 B1 *  3/2003  Postman ............... G06F 1/1626
                                                235/487

(Continued)

FOREIGN PATENT DOCUMENTS

| DE | 10 2013 107 964 A1 | 1/2015 |
| WO | 2013/064189 A1 | 5/2013 |
| WO | 2015/149757 A2 | 10/2015 |

OTHER PUBLICATIONS

International Preliminary Report on Patentability, dated Jan. 8, 2019, for International Application No. PCT/DE2017/100567, 9 pages.

(Continued)

*Primary Examiner* — Michael Sun
(74) *Attorney, Agent, or Firm* — Seed IP Law Group LLP (57) ABSTRACT

A plug connector component is provided having a housing, at least one control module arranged therein and an operating system for operating the control module. At least one functional module that can be controlled by the control module can be introduced into the housing. In addition, the control module is configured to receive at least one container with at least one process configured for using an operating system core of the operating system and to implement same, and to at least partially control the functional module by the process. Related plug connectors, systems and methods are also provided.

10 Claims, 2 Drawing Sheets

(56) References Cited

U.S. PATENT DOCUMENTS

| | | | | |
|---|---|---|---|---|
| 6,644,547 B1* | 11/2003 | White | ................... | G06Q 20/04 |
| | | | | 235/381 |
| 9,847,608 B2 | 12/2017 | Bruex et al. | | |
| 2015/0007636 A1* | 1/2015 | Benkert | ............ | G01N 33/0073 |
| | | | | 73/23.2 |
| 2018/0062197 A1* | 3/2018 | Thiel | ...................... | H02S 40/42 |

OTHER PUBLICATIONS

Hohmuth, "Virtualisierung für Produktion and IoT [Virtualization for Production and IoT]," *Embedded Design* 1:17-19, 2016. (6 pages) (with English Machine Translation).

International Search Report and Written Opinion, dated Oct. 24, 2017, for International Application No. PCT/DE2017/100567, 15 pages. (with English Translation of Search Report).

Morabito et al., "Enabling Data Processing at the Network Edge through Lightweight Virtualization Technologies," *IEEE International Conference on Sensing, Communication and Networking*, London, United Kingdom, Jun. 27, 2016, 6 pages.

\* cited by examiner

PLUG CONNECTOR COMPONENT, PLUG CONNECTOR, PLUG CONNECTOR SYSTEM AND METHOD FOR ASSEMBLING AND OPERATING A PLUG CONNECTOR

BACKGROUND

Technical Field

The present disclosure relates to a plug-connector component with a housing, with at least one control module arranged therein, and with an operating system for operating the control module, in which at least one functional module capable of being controlled by the control module is capable of being inserted into the housing. The disclosure further relates to a plug connector with at least one such plug-connector component and with at least one functional module arranged in the housing, and also to a plug-connector system with at least one such plug connector and with at least one mating connector capable of being connected to said plug connector. Still further, the disclosure relates to a method for assembling and operating such a plug connector, in the course of which at least one functional module capable of being controlled by the control module is inserted into the housing.

Description of the Related Art

Modular plug connectors with a housing are known that are capable of being configured and expanded at will by functional modules of various types that are capable of being inserted into the housing and that may have been equipped with diverse sensors and actuators in the given case and as a result may have been set up for highly diverse functions. In this case, several such functional modules may have been arranged within the housing at the same time. For the purpose of controlling the functional modules, usually a control module is provided which is likewise arranged within the housing. The control module and the functional modules in this case may have been arranged on and fixed to a retaining frame likewise located within the housing.

Although a certain flexibility of the plug connectors can be obtained by the modular design of such plug connectors, which guarantees an arbitrary interchangeability of the functional modules, this flexibility is nevertheless insufficient as regards new functional modules to be inserted into the housing. Various configurations of the plug connector with various functional modules are indeed possible. However, since functional modules with diverse sensors and actuators make diverse demands on the software for the control thereof, and also on the computing power of the control module, and, in addition, aspects of usability and safety have to be taken into consideration, and since, furthermore, not all possible types of functional module can be taken into consideration at the time of production of the plug connector, the functional modules capable of being used for the plug connector are restricted to the types originally considered and specified at the time of production of the plug connector. This inevitably results in a restriction of the configurations of the plug connector that are capable of being realized with various functional modules to combinations of functional modules that pertain to the types initially considered and specified. In particular, the control module provided during the operation of the plug connector for the purpose of controlling the functional modules frequently exhibits monolithic software, and as a result has been specifically tailored to the types of functional modules initially considered. An expansion of the functional modules capable of being used by the plug connector to functional modules that pertain to types other than the types originally considered therefore frequently proves in practice to be impossible or very difficult and laborious.

BRIEF SUMMARY

Embodiments of the present invention provide a plug-connector component, a plug connector, a plug-connector system and a method for assembling and operating a plug connector that offer flexibility as regards the usability of new types of functional module.

According to embodiments of the present invention, the control module of the plug-connector component has been set up to receive and to implement at least one container with at least one process that has been set up for utilizing a kernel of the operating system, and to control the functional module at least partially by the process. Correspondingly, in the case of the method according to embodiments of the invention at least one container with at least one process that has been set up for utilizing a kernel of the operating system is transferred to the control module and implemented, and the process is executed at least for the purpose of partially controlling the functional module. As a consequence of this encapsulation or virtualization of the software necessary for controlling a functional module, it is no longer necessary to set up the plug-connector component in advance for controlling specific functional modules that pertain to certain predetermined types. Instead of this, functional modules of arbitrary different types are capable of being controlled with the same control module, without the control module having been set up in advance for controlling functional modules of these types, since each functional module is represented, independently of the control module, by a container that exhibits the processes or procedures necessary for controlling this functional module and that with insertion of the functional module into the housing of the plug-connector component is transferred to the control module and implemented by or in the latter. In this way, for the plug-connector component and the plug connector, in particular the modular plug connector, the greatest possible flexibility arises as regards new types of functional module, without fundamental software updates or upgrades of the operating system of the control module being required when a functional module of a new type is used for the first time. Accordingly, it is therefore unimportant which actuators or sensors the functional module specifically exhibits or whether the functional module exhibits an air-pressure sensor, a current sensor, an interface for an optical waveguide or a photodiode, or whether the functional module is a modular insert without any sensor, or a network node. Even functional modules with functions that are complicated to control can, in principle, be designed to be independent of the control module. Each functional module inserted or capable of being inserted into the housing is preferentially represented by a respective container.

Quite generally, the container may be a file system that exhibits a process or several processes in the form of program codes of one or more applications, and all the necessary libraries and files for the operation of the container. Through the use of containers, problems such as package dependencies and incompatibilities are circumvented. Processes of the respective containers may have been separated from one another by kernel namespaces.

So-called C-groups can ensure the management of resources, so that defined resources can be allocated to each container.

In this case, the container may exhibit not just one process but rather several processes, in fact arbitrarily many, in which connection a "process" may be understood to mean an event that is monitored by a program which needs a processor for execution. In this way, the process may be an application or an application program capable of running in the control module, or it may be a part of such an application or application program. All the processes of the container may have been set up for utilizing the kernel of the operating system. In addition, containers for data processing can be installed or implemented in the control module.

The container may have been provided, in particular, for a virtualization—that is to say, for a simulation of a hardware object or software object by a similar object of the same type with the aid of a software layer—on the operating-system level. In particular, the process may be a process of the operating system itself that utilizes the kernel of the operating system when it is running. Consequently, the container may take the form of an operating system running in isolated manner in the control module. In this context, the container may represent or generate virtual environments that have their own processes but utilize jointly for them the kernel of the operating system of the control module in which the container has been implemented. Containers may also exhibit, in addition to the one or more processes, one or more applications, metadata, drivers, an independent file system, program libraries, interfaces and also tools such as scripts for controlling the containers. Particularly preferably, the container is a Linux container (LXC).

The control module may advantageously have been set up furthermore to receive and to implement at least one container with at least one data-processing process that has been set up for utilizing the kernel of the operating system, and also to receive data to be processed from the functional module and to process said data using the data-processing process. Correspondingly, in the course of the method at least one container with at least one data-processing process that has been set up for utilizing the kernel of the operating system can furthermore be transferred advantageously to the control module and implemented, and data to be processed from the functional module can be transferred to the control module and processed using the data-processing process. In this connection, the container with the data-processing process may be a container different from the container with the process for controlling the functional module, or the two named containers may be identical to one another, so that one and the same container exhibits both the data-processing process and the process for controlling the functional module. Consequently it is possible to represent by containers also such functional modules, the function of which consists exclusively in the generation or provision of data to be processed. The data to be processed may be, for example, data that are needed for a vibration analysis.

In a particularly advantageous embodiment of the plug-connector component, after insertion of the functional module into the housing the control module receives the container automatically from an external data-source or from the functional module. Accordingly, in one embodiment of the method according to the invention, after insertion of the functional module into the housing the container is automatically transferred to the control module from an external data-source or from the functional module. By virtue of the automatic transferring of the container to the control module, the ease of handling or the operation of the plug connector and of the plug-connector system is substantially simplified. The external data-source may be any device such as, for example, a simple data memory, a fixed or mobile computer device, a mobile phone, smartglasses, or a drone. In particular, the computer device may be a central data-processing system that can communicate in hard-wired or wireless manner with a plurality of plug connectors or plug-connector systems or other devices. Steps necessary for the automatic transferring can be carried out in this case by the control module or the processor or operating system thereof or by a container of the control module or functional module that is responsible for administration.

The plug-connector component or the control module preferentially exhibits at least one processor and/or at least one memory and/or at least one switch and/or at least one interface for a wireless or hard-wired data-transfer link and/or at least one IP (Internet Protocol) address. The processor may have been provided, in particular, for the execution of the process. Furthermore, the processor may have been set up as a so-called bus controller for controlling a bus system of the plug-connector component, of the plug connector or plug-connector system, via which the control module communicates with one or more functional modules. To the extent that the control module or the plug-connector component has been set up to communicate via a network such as the Ethernet, for instance, the processor may also have been provided for this for the purpose of control, and, for instance, may have been set up as a so-called Ethernet controller. Data generated by the process or needed by it may in this case be, or have been, stored in the memory. On the other hand, the switch may be responsible for the establishment of the connection of the control module or plug-connector component to a network such as the Ethernet. The communication can take place, in particular, via the interface, in which case the data-transfer link may be at least partially or fully hard-wired or may have been at least partially or fully established by a glass fiber or may be at least partially or fully wireless. The assigning of an IP address enables, in addition, a simple, IP-based communication with the plug-connector component or with the control module within the meaning of Industry 4.0.

According to a particularly advantageous embodiment, a plug connector is provided in which an IP address has been assigned to the container. In this case, it is advantageous if respective IP addresses have been assigned to all the containers present in the control module, in order that all the functional modules are virtually mapped by the respective containers and are given by the latter a digital representative, as it were, with an IP address. Acting through the individual containers, the functional modules are therefore capable of being used as so-called Industry 4.0 components that can communicate with the IT (information technology) world and with ERP (enterprise resource planning) systems. This virtual representation contains the relevant properties and functionalities of the assigned component and is generally designated as an administration shell. A container structure offers the possibility of encapsulating each component as an administration shell in its own container. Consequently each administration shell automatically gets an IP address, as a result of which a simple, IP-based communication within the meaning of Industry 4.0 is made possible. Specifically, each linked computer device or component can accordingly be identified in one-to-one correspondence and accessed via a network, regardless of the age of the computer device or component, or of the protocols being used. In this way, existing systems can be linked up quickly and straightforwardly to IVIES (manufacturing execution systems), ERP systems or a so-called cloud. Furthermore, relevant data from all the linked-up components can be made available in real time.

Advantageously, the plug-connector component exhibits at least one retaining frame on which the control module has been accommodated and/or fixed and which has been set up for the additional accommodation and/or fixing of the functional module. Such a retaining frame, which may be arranged in the housing, constitutes in practice a possibility, capable of being handled particularly conveniently and easily, in order, on the one hand, to fasten or to fix various modules in the housing securely and, on the other hand, to be able to remove or exchange the same at any time when required.

Furthermore, it is an advantage if the plug-connector component exhibits at least one data bus which is connected to the control module and capable of being connected to the functional module and which extends at least partially or substantially completely over the retaining frame. By the data bus, which can be used by the control module for controlling the functional modules, being arranged partially or completely on the retaining frame in such a manner that it extends over the latter, a space-saving design of the plug-connector component and of the plug connector is realized, since little space is needed within the housing. Such a design is therefore favorable for the miniaturization of the plug-connector component and also of the plug connector and the plug-connector system.

Moreover, in the plug-connector system the control module may be set up to generate at least one partial or complete copy of the container and to transfer the copy to the mating-connector control module and to implement it in the latter, or to transfer the copy to an external computer device and to implement it in the latter, to the extent that requisite free resources of the plug connector for controlling the functional module are insufficiently available or fall short of a predetermined lower limit. Correspondingly, in a particularly advantageous method at least one partial or complete copy of the container is generated and transferred to a mating-connector control module of a mating connector connected to the plug connector and implemented in the latter or transferred to an external computer device and implemented in the latter, to the extent that requisite free resources of the control module for controlling the functional module are insufficiently available or fall short of a predetermined lower limit. Consequently, for the container implemented in the control module of the plug connector, or for the process or processes thereof, the utilization of unutilized or free resources existing in the mating-connector control module or in the mating connector is made possible. In cases in which a resource needed for running the process is not available or is insufficiently available in the control module or in the plug connector, the container can, if required, proactively access resources of the mating-connector control module or of the mating connector, and utilize these resources for itself or its process. Therefore it is ensured, on the one hand, that an execution of the process, even when resources needed for the execution thereof are not available in the control module or in the plug connector, does not inevitably fail to happen or does not occur incompletely or with great losses of power. On the other hand, redundant resources of the mating-connector control module or of the mating connector are utilized that would otherwise remain unutilized. Overall, in this embodiment of the present invention a flexible and more effective utilization of the resources available to the plug-connector system is obtained.

In addition, in this embodiment the programming effort is considerably reduced, or the programming is considerably facilitated. Ordinarily, applications are dedicated, as a rule, for predefined application environments. At the time of programming, application developers must either know or specify as mandatory peripheral equipment available later. The knowledge or specification of the available peripherals proves to be problematic, particularly in dynamic environments, if a specific infrastructure of a computer system or of a computer device is difficult to foresee or very complex. In such cases, redundancies for safeguarding and stabilizing the operational sequence of the process also have to be taken into consideration. For these reasons, the fact that at the time of programming of the operating system and/or of the container(s) software developers no longer need to pay attention to resources available later proves to be a particular advantage of this embodiment, since containers can proactively access free resources if necessary, and therefore the aforementioned measures can be dispensed with.

After implementation of the copy of the container in the mating-connector control module or in the external computer device, said copy can exist in the mating-connector control module or in the external computer device in parallel with the original container in the control module. In particular, offshoots of this container in the mating-connector control module or in the external computer device can be generated which, depending on the situation, exhibit only respective parts or processes of the original container that are needed in the mating-connector control module or in the external computer device, without immediately having to copy the original container completely. Because parts of the original container that are not needed when generating the copy are dispensed with, further resources can be saved in such cases. Nevertheless, in practice a multiplication or distribution of the entire original container is often desirable or necessary, the copy being a complete copy of the original container.

In a particularly advantageous embodiment, the copy of the original container that is implemented in the mating-connector control module or in the external computer device has been set up for the transferring of data to the original container or for the exchange of data with the original container. Accordingly, the original container can have recourse to resources of the mating-connector control module or of the external computer device, without inevitably having to leave the control module and without having to be uninstalled or deleted in the control module of the plug-connector component or of the plug connector. Instead of this, after work has been carried out the copy implemented in the mating-connector control module or in the external computer device can be uninstalled or deleted. The exchange of data or a communication between the original container and its copy may be undertaken, for instance, on the basis of an internet protocol. In particular, a container which with at least one or more of its copies, which may have been implemented in different devices—for example, in the mating-connector control module and in one or more computer devices, one of which may have been set up as a central data-processing system—may have been set up for the exchange of data, so that the container and its copies, viewed from outside, act as a single container or process extending over several devices.

In another particularly advantageous embodiment, the plug-connector system has, however, been set up to delete the original container after implementing the copy of the container. In particular, in this embodiment the original container may exhibit at least one installation program or at least one installation process for generating and/or implementing the copy. Correspondingly, the original container and/or its copy may alternatively or additionally exhibit at least one uninstallation program or at least one uninstallation process for deleting the original container. Furthermore, the copy may exhibit a script that at the start of the copy uninstalls the original container. This embodiment realizes containers that within the plug-connector system are proactively mobile from the plug connector or control module to the mating connector or mating-connector control module or to an external computer device. Correspondingly, the copy may also be proactively mobile inside and outside the plug-connector system. The container or its copy can alternate arbitrarily between various devices and can move at any time to the device having the currently most favorable resources in the given case. Such a plug-connector system is distinguished by a particularly high flexibility and efficiency in the utilization of resources.

BRIEF DESCRIPTION OF THE SEVERAL VIEWS OF THE DRAWINGS

In the following, the invention will be elucidated in more detail on the basis of example embodiments with the aid of drawings. Shown are.

DETAILED DESCRIPTION

Figure 1:
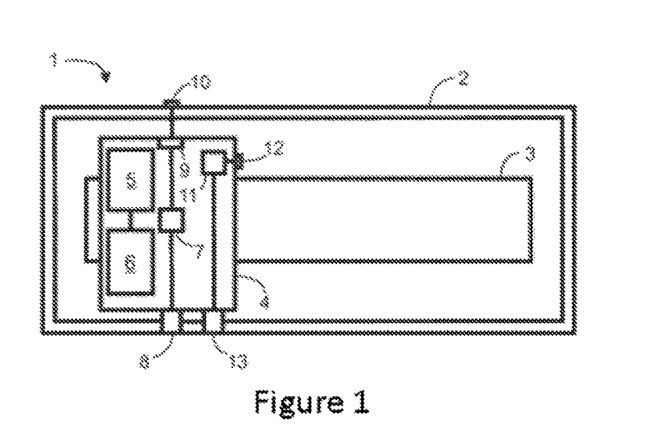
FIG. 1 a plug-connector component in a schematic representation.

In FIG. 1 a plug-connector component 1 according to an embodiment of the invention is represented in a greatly simplified, schematic representation. The plug-connector component 1 exhibits a housing 2 in which a retaining frame 3 has been provided. A control module 4 is arranged on the retaining frame 3 and is retained by the retaining frame 3 in a fixed manner. Although no further module has been represented in FIG. 1, the housing 2 and the retaining frame 3 are dimensioned to be sufficiently large in order that, in addition to the control module 4, yet further modules can be arranged on the retaining frame 3.

The control module 4 exhibits a processor 5 and a memory or data memory or a storage means 6, said processor 5 being able to read data from the storage means 6 and store them in the storage means 6. By way of operating system for the processor 5, the known Unix-like multi-user operating system Linux has been provided. Furthermore, the control module 4 exhibits an Ethernet controller 7 which is connected, on the one hand, to a first plug-in point 8 of the plug-connector component 1 and, on the other hand, to a circuit-breaker or switching element or switch 9, the first plug-in point 8 and the switch 9 being located on opposite sides of the control module 4. The switch 9 is, in turn, connected to an interface 10 which has been formed on a side of the plug-connector component 1 that is opposite the plug-in point 8 and with which a connection to an Ethernet is capable of being established. Lastly, the control module 4 exhibits a first bus controller 11 which is connected to a first bus interface 12 of the control module 4 and also to a second plug-in point 13 of the plug-connector component 1, arranged adjacent to the first plug-in point 8.

Although the processor 5, the Ethernet controller 7 and the first bus controller 11 take the form of respectively different modular units in the plug-connector component 1, any two or all three of these modular units or components may also have been realized by a single modular unit or by a single processor.

Figure 2:
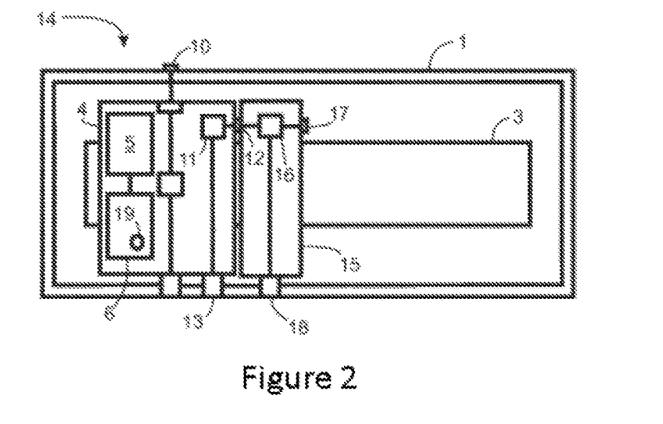
FIG. 2 a plug connector with the plug-connector component of FIG. 1 and with a functional module in a schematic representation.

FIG. 2 shows a plug connector 14 which exhibits, in addition to the previously described plug-connector component 1, a first functional module 15 which, like the control module 4, is arranged on the retaining frame 3 and fixed to the latter. The first functional module 15 exhibits a second bus controller 16, a second bus interface 17 and a third plug-in point 18. Via the first bus interface 12 of the control module 4, the second bus controller 16 is connected to the first bus controller 11 of the control module 4, as a result of which a data bus extending from the first control module 4 to the first functional module 15 is formed. Furthermore, the second bus controller 16 is connected to the bus interface 17 which is capable of being connected to a bus controller of a further functional module which is capable of being optionally inserted into the plug-connector component 1 and which is not shown in FIG. 2. The third plug-in point 18 of the first functional module 15 is arranged adjacent to the second plug-in point 13 and connected to the second bus controller 16. In order that the first functional module 15 is able to perform defined functions, it further exhibits at least one appliance, not represented in FIG. 2 for reasons of clarity, such as an actuator or sensor. For instance, the first functional module 15 may have been equipped with an air-pressure sensor, a current sensor, a photodiode or a light-wave connector.

After insertion of the first functional module 15 into the plug-connector component 1, as a result of which the plug connector 14 is formed, a first software container or simply container 19 is transferred to the control module 4 either from the functional module 15 via the first bus interface 12 or from an external device or computer device not shown in FIG. 2—such as, for instance, a central data-processing system—via the interface 10. The first container 19 received by the control module 4 is stored in the memory 6 and implemented in the control module 4 by the processor 5. By way of the first container 19, which maps functions of the first functional module 15 outwardly like an external instrument, the processor 5 is in a position to control the first functional module 15. For this purpose, the first container 19 exhibits corresponding processes which have been set up for utilizing a kernel of the Linux operating system which has been set up in the control module 4 and which the processor 5 uses or causes to run for the purpose of controlling the first functional module 15. To the extent that one function of the first functional module 15 consists in providing or generating data to be processed, the first container 19 may, in addition, exhibit a data-processing process which is used by the control module 4 for the processing of said data. Alternatively, in addition to the first container 19 a further container may have been provided which exhibits such a data-processing process.

Figure 3:
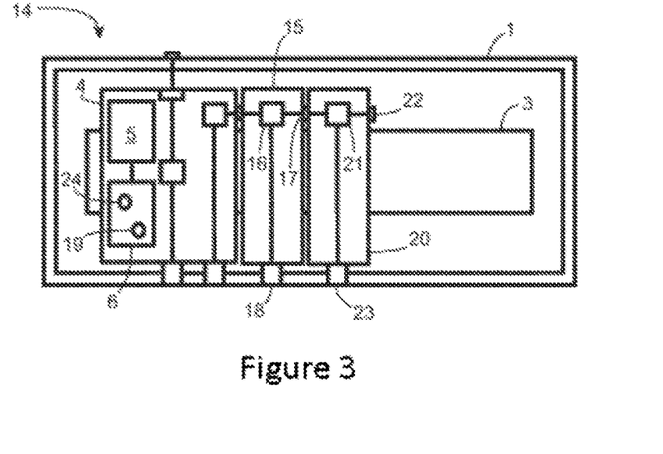
FIG. 3 the plug connector of FIG. 2 with a further functional module.

So long as the space in the housing 2 and on the retaining frame 3 is sufficient, the plug connector 14 can be provided with arbitrarily many such functional modules. On this point, FIG. 3 shows, by way of example, the plug connector 14 with a further, second functional module 20 which in principle has been constructed to be similar to the first functional module 15. The second functional module 20 exhibits a third bus controller 21, a third bus interface 22 and a fourth plug-in point 23. Via the second bus interface 17 of the first functional module 15, the third bus controller 21 is connected to the second bus controller 16 of the first functional module 15, as a result of which the data bus extending from the first control module 4 to the first functional module 15 is expanded or extended to the second functional module 20. Furthermore, the third bus controller 21 is connected to the fourth bus interface 22 which is capable of being connected to a bus controller of a further functional module which is optionally capable of being inserted into the plug-connector component 1 and is not shown in FIG. 3. The fourth plug-in point 23 of the second functional module 20 is arranged adjacent to the third plug-in point 18 and connected to the third bus controller 21. In order that the second functional module 20 is able to perform defined functions, it further exhibits at least one appliance, not represented in FIG. 3 for reasons of clarity, such as an actuator or sensor. However, since the second functional module 20 exhibits actuators or sensors different from those of the first functional module 15, functions are also provided by the second functional module 20 that are different from those provided by the first functional module 15.

Also after insertion of the second functional module 20 into the plug-connector component 1, as previously described a second container 24 is transferred to the processor 5, stored in the storage means 6, and implemented in the control module 4. By way of the second container 24, functions of the second functional module 20 are mapped outwardly like a stand-alone instrument. By using the second container 24, the processor 5 is in a position to control the second functional module 20. For this purpose, the second container 24 exhibits corresponding processes which have been set up for utilizing the kernel of the Linux operating system which has been set up in the control module 4 and which the processor 5 uses or causes to run for the purpose of controlling the second functional module 20. To the extent that one function of the second functional module 20 consists in providing or generating data to be processed, the second container 24 may, in addition, exhibit a data-processing process which is used by the control module 4 for the processing of said data. Alternatively, in addition to the second container 24 and the first container 19, a further container may have been provided which exhibits such a data-processing process.

In corresponding manner, the plug connector 14 is capable of being expanded by arbitrary functional modules which, in addition to the first functional module 15 and the second functional module 20, or instead of one of these two functional modules 15 and 20, can be inserted into the plug connector 14 and make respective different functions available. Since for each newly added functional module a corresponding container, which maps the functions of this functional module outwardly like a stand-alone instrument, is transferred to the control module 4, even functional modules with functions that were not taken into consideration at the time of production of the plug-connector component 1 and of the control module 4 can be inserted into the plug connector 14 without difficulties and without having to modify the Linux operating system which has been set up in the control module 4.

Figure 4:
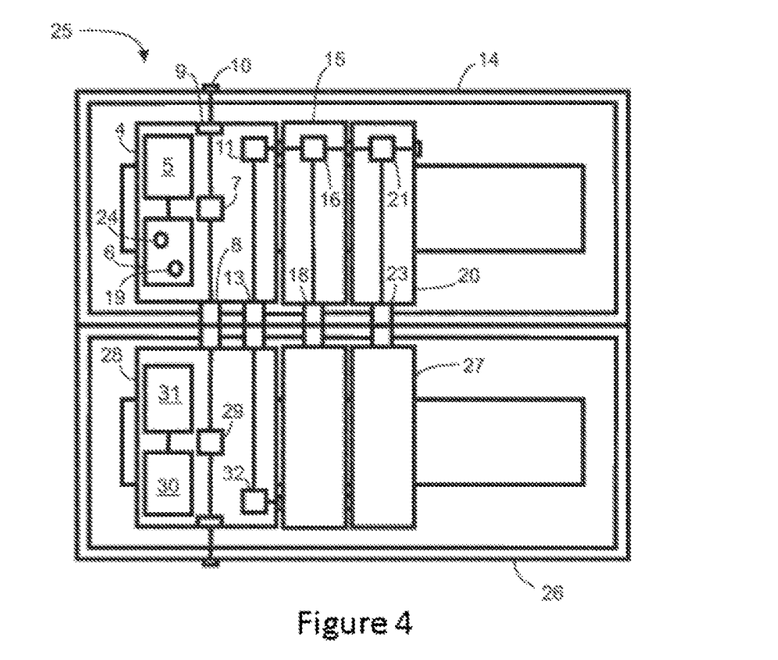
FIG. 4 a plug-connector system with the plug connector of FIG. 3 in a schematic representation.

FIG. 4 now shows a plug-connector system 25 which exhibits the plug connector 14 and also a mating connector 26 detachably connected thereto. The mating connector 26 has been constructed substantially in mirror-image manner in relation to the plug connector 14, in which connection, however, instead of the first functional module 15 and the second functional module 20, two passive modules 27 are arranged in the mating connector 26, which are not provided either with actuators or with sensors and which are detachably connected via the third plug-in point 18 and the fourth plug-in point 23 to the respective first functional module 15 and the second functional module 20. A mating-connector control module 28 of the mating connector 26, which has been constructed to be similar to the control module 4, is detachably connected to the control module 4 via the first plug-in point 8 and the second plug-in point 13. In particular, the Ethernet controller 7 is connected to a mating-connector Ethernet controller 29 of the mating connector 26 via the first plug-in point 8. Furthermore, the mating-connector control module 28 of the mating connector 26 exhibits a mating-connector processor 30 and a mating-connector storage means 31 and also a mating-connector bus controller 32 which is detachably connected to the second plug-in point 13 and therefore to the first bus controller 11. In practice, the mating connector 26 is frequently permanently installed in a switch cabinet.

During the operation of the plug-connector system 25 the first functional module 15 and the second functional module 20 are controlled by the processor 5, as already mentioned. For the purpose of controlling the first functional module 15, the processor 5 has recourse to the first container 19, and causes the processes contained or encapsulated in the first container 19 to run. Correspondingly, the processor 5 has recourse to the second container 24 for the purpose of controlling the second functional module 20, and causes the processes contained or encapsulated in the second container 24 to run. This may happen either successively or in parallel. In this connection, the processor 5 communicates with the first functional module 15 and with the second functional module 20 via the data bus extending from the control module 4 to the second functional module 20 via the first functional module 15, said data bus being controlled by the first bus controller 11, the second bus controller 16 and the third bus controller 21. In addition, the processor 5 and the mating-connector processor 30 are in a position to communicate with one another or to exchange data via a data bus which is formed by the connection of the first bus controller 11 and the mating-connector bus controller 32 and controlled by the first bus controller 11 and the mating-connector bus controller 32. An exchange of data or a communication with external devices or instruments takes place via the Ethernet, to which the plug connector 14 is connected via the interface 10. The communication over the Ethernet is controlled by the Ethernet controller 7 which, among other things, actuates the switch 9. To the extent that the mating connector 26 or the mating-connector control module 28 communicates with the Ethernet or exchanges data, the Ethernet controller 7 is assisted by the mating-connector Ethernet controller 29.

During the operation of the plug-connector system 25 it may happen that free resources existing in the control module 4—such as, for example, the computing capacity of the processor 5—are not sufficient for controlling the first functional module 15 and the second functional module 20. In such cases, thanks to the representation of the first functional module 15 and of the second functional module 20 as first container 19 and second container 24 in the plug-connector system 25, for the control module 4 and for the plug connector 14 there is the possibility of having recourse to free resources of the mating connector 26 and of the mating-connector control module 28, respectively. For this purpose, the container in question is displaced or migrated from the plug connector 14 to the mating connector 26. This can be done by creating a copy of the container and by transferring this copy to the mating connector 26.

Figure 5:
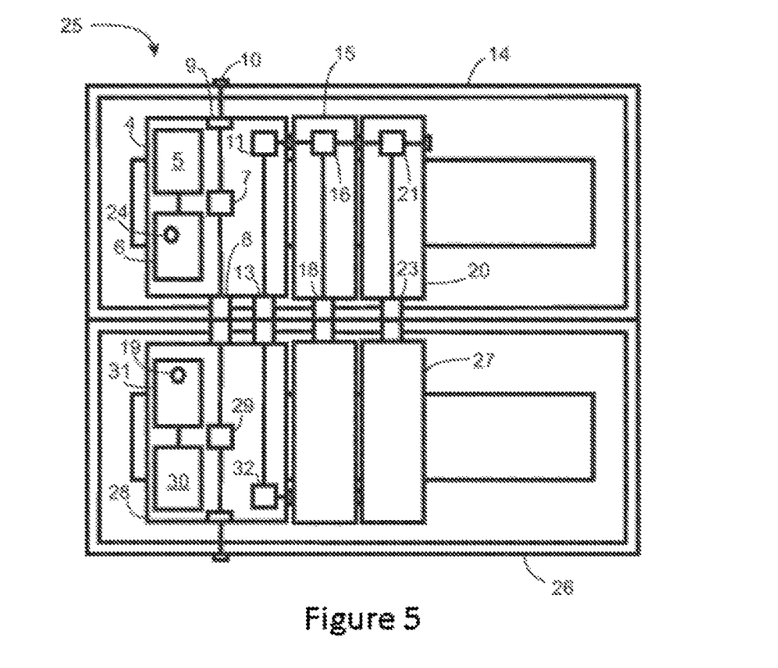
FIG. 5 the plug-connector system of FIG. 4 with migrated container.

This can be seen in FIG. 5, in which the first container 19 has been migrated or displaced from the storage means 6 of the plug connector 14 into the mating-connector storage means 31, which can take place via the data bus controlled by the first bus controller 11 and the mating-connector bus controller 32. The first functional module 15 can now be controlled by utilizing resources of the mating connector 26 or of the mating-connector control module 28, by the mating-connector processor 30 causing processes of the first container 19 that are needed for this to run, and communicating with the processor 5 via the data bus between the mating-connector bus controller 32 and the first bus controller 7. On the other hand, the control of the second functional module 20 takes place in unchanged manner using the second container 24, in which connection the processor 5 executes processes of the second container 24 that are needed for this purpose.

Instead of migrating the first container 19 and/or the second container 24 to the mating connector 26, in addition it is possible to migrate said containers, via the interface 10 and the Ethernet linked thereto, to any other external device—such as, for example, a central data-processing system—and to cause processes of the migrated container to be executed by said system. In this way, it is possible to distribute containers to many suitable devices, and to utilize the resources thereof effectively.

In practice, it may happen that the function either of the first functional module 15 or of the second functional module 20 consists substantially or even exclusively in the generation or provision of data to be processed. Although in the above embodiments both the first container 19 and the second container 24 were described as exhibiting a process for controlling the first functional module 15 or the second functional module 20, in such cases the relevant first container 19 or second container 24 may exhibit a data-processing process instead of the process for controlling the respective container 19 or 24. Depending upon the control module 4 or 28 or the device in which the container 19 or 24 is currently located, this data-processing process can be employed or used by the relevant control module 4 or 28 or by the relevant device for the purpose of processing the data.

To the extent that the first container 19 and the second container 24 are provided with respective IP addresses, there may be a virtual mapping of the first functional module 15 and of the second functional module 20 by virtue of said addresses. Accordingly, the first functional module 15 and the second functional module 20 may become usable within the meaning of Industry 4.0 via the first container 19 and the second container 24. Information about current operating states of the first functional module 15 and of the second functional module 20 are, as a result, capable of being retrieved in real time. In particular, data that are generated or provided by the first functional module 15 and by the second functional module 20 are available in real time or can be accessed in real time.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug-connector system, comprising:
a plug connector component including a housing, with at least one control module arranged therein, and with an operating system for operating the control module;
at least one functional module arranged in the housing of the plug connector component, the at least one functional module capable of being controlled by the control module; and
a mating connector capable of being connected to the plug connector component, which exhibits at least one mating-connector control module which after connection of the plug connector component and the mating connector is connected to the control module,
wherein the control module has been set up to receive and to implement at least one container with at least one process that has been set up for utilizing a kernel of the operating system, and to control the functional module at least partially by the process, and
wherein the control module has been set up to generate at least one partial or complete copy of the container and to transfer the copy to the at least one mating-connector control module and to implement it in the latter, or to transfer the copy to an external computer device and to implement it in the latter, to the extent that requisite free resources of the plug connector component for controlling the at least one functional module are insufficiently available or fall short of a predetermined lower limit.

2. The plug-connector system as claimed in claim 1, in which the control module has furthermore been set up to receive and to implement at least one container with at least one data-processing process that has been set up for utilizing the kernel of the operating system, and also to receive data to be processed from the functional module and to process said data using the data-processing process.

3. The plug-connector system as claimed in claim 1, in which after insertion of the functional module into the housing the control module receives the container automatically from an external data-source or from the functional module.

4. The plug-connector system as claimed in claim 1, which exhibits at least one processor and/or at least one memory and/or at least one switch and/or at least one interface for a wireless or hard-wired data-transfer link and/or at least one IP address.

5. The plug-connector system as claimed in claim 1, further comprising at least one retaining frame on which the control module is accommodated and/or fixed and which has been set up for the additional accommodation and/or fixing of the functional module.

6. The plug-connector system as claimed in claim 5, further comprising at least one data bus which is connected to the control module and capable of being connected to the functional module and which extends at least partially or substantially completely over the retaining frame.

7. The plug connector system as claimed in claim 1, in which an IP address is assigned to the container.

8. A method for assembling and operating a plug connector system which exhibits at least one plug-connector component with a housing and also at least one control module arranged therein and an operating system for operating the control module, in which:
at least one functional module capable of being controlled by the control module is inserted into the housing, at least one container with at least one process, which has been set up for utilizing a kernel of the operating system, is transferred to the control module and implemented, the process is executed at least for the purpose of partially controlling the functional module, and at least one partial or complete copy of the container is generated and transferred to the mating-connector control module of a mating connector connected to the plug connector and is implemented in the latter or is transferred to an external computer device and implemented in the latter, to the extent that requisite free resources of the control module for controlling the functional module are insufficiently available or fall short of a predetermined lower limit.

9. The method as claimed in claim 8, in which furthermore at least one container with at least one data-processing process that has been set up for utilizing the kernel of the operating system is transferred to the control module and implemented, and data to be processed from the functional module are transferred to the control module and processed using the data-processing process.

10. The method as claimed in claim 8, in which after insertion of the functional module into the housing the container is automatically transferred to the control module from an external data-source or from the functional module.

* * * * *